(12) United States Patent
Brillon

(10) Patent No.: US 11,149,795 B2
(45) Date of Patent: Oct. 19, 2021

(54) TURBINE ENGINE BEARING USED AS A STATIC ELECTRICITY LEAK PATH

(71) Applicant: PRATT & WHITNEY CANADA CORP., Longueuil (CA)

(72) Inventor: Louis Brillon, Varennes (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 287 days.

(21) Appl. No.: 16/290,207

(22) Filed: Mar. 1, 2019

(65) Prior Publication Data

US 2020/0277994 A1 Sep. 3, 2020

(51) Int. Cl.
| F02C 7/06 | (2006.01) |
| F16C 41/00 | (2006.01) |
| F02K 3/06 | (2006.01) |
| F01D 25/16 | (2006.01) |
| F16C 19/52 | (2006.01) |

(52) U.S. Cl.
CPC ............ *F16C 41/002* (2013.01); *F01D 25/16* (2013.01); *F02C 7/06* (2013.01); *F02K 3/06* (2013.01); *F16C 19/52* (2013.01); *F05D 2220/323* (2013.01); *F05D 2240/50* (2013.01); *F05D 2300/20* (2013.01); *F16C 2360/23* (2013.01)

(58) Field of Classification Search
CPC .... F16C 41/002; F16C 2360/23; F16C 19/52; F02K 3/06; F01D 25/16; F01D 25/24; F01D 25/28; F05D 2220/323; F05D 2240/50; F05D 2300/20; F02C 7/06; B64D 45/02; B64D 27/10; B64D 27/26
See application file for complete search history.

(56) References Cited

U.S. PATENT DOCUMENTS

| 10,253,818 | B1* | 4/2019 | Ince .................. F16C 19/52 |
| 10,549,865 | B2* | 2/2020 | Kelly ................ F01D 25/24 |
| 10,578,164 | B1* | 3/2020 | Zhong ............... F16C 19/06 |
| 2009/0288628 | A1 | 11/2009 | Watts, III et al. |
| 2015/0364887 | A1* | 12/2015 | Zink .................. F16C 11/0685 439/17 |
| 2016/0312834 | A1* | 10/2016 | White ............... F16C 33/7823 |
| 2017/0108047 | A1* | 4/2017 | White ............... F16C 33/82 |
| 2017/0276179 | A1* | 9/2017 | Hutchison ......... F16C 19/06 |
| 2017/0280540 | A1* | 9/2017 | Theis ................. H01R 13/6485 |
| 2018/0195407 | A1* | 7/2018 | Kudrna .............. F01D 25/005 |
| 2019/0063500 | A1* | 2/2019 | Hart .................. F16C 33/785 |

(Continued)

FOREIGN PATENT DOCUMENTS

EP 2669512 B1 9/2015

*Primary Examiner* — Aaron R Eastman
(74) *Attorney, Agent, or Firm* — Norton Rose Fulbright Canada LLP

(57) ABSTRACT

A gas turbine engine with a rotor having a shaft mounted to the engine with a plurality of electrically insulating bearings is provided. The electrically insulating bearings are coupled to the shaft to support the rotor in the engine. There is at least one electrically conductive bearing coupled to the shaft and that further support the rotor in the engine. An electrically conductive path is defined between the rotor and an electrical ground of the engine. The electrically conductive path is defined through the electrically conductive bearing to reach the electrical ground of the engine. A method for electrostatically discharging a rotor supported in the gas turbine engine is also provided.

20 Claims, 3 Drawing Sheets

(56) References Cited

U.S. PATENT DOCUMENTS

| | | | |
|---|---|---|---|
| 2019/0178294 A1* | 6/2019 | Hong | H02K 5/173 |
| 2020/0072288 A1* | 3/2020 | Roman | F16C 33/7856 |
| 2020/0080597 A1* | 3/2020 | White | F16C 41/002 |
| 2020/0263734 A1* | 8/2020 | Kottapalli | F16C 32/0436 |
| 2020/0370597 A1* | 11/2020 | Bell | F16C 33/1095 |

\* cited by examiner

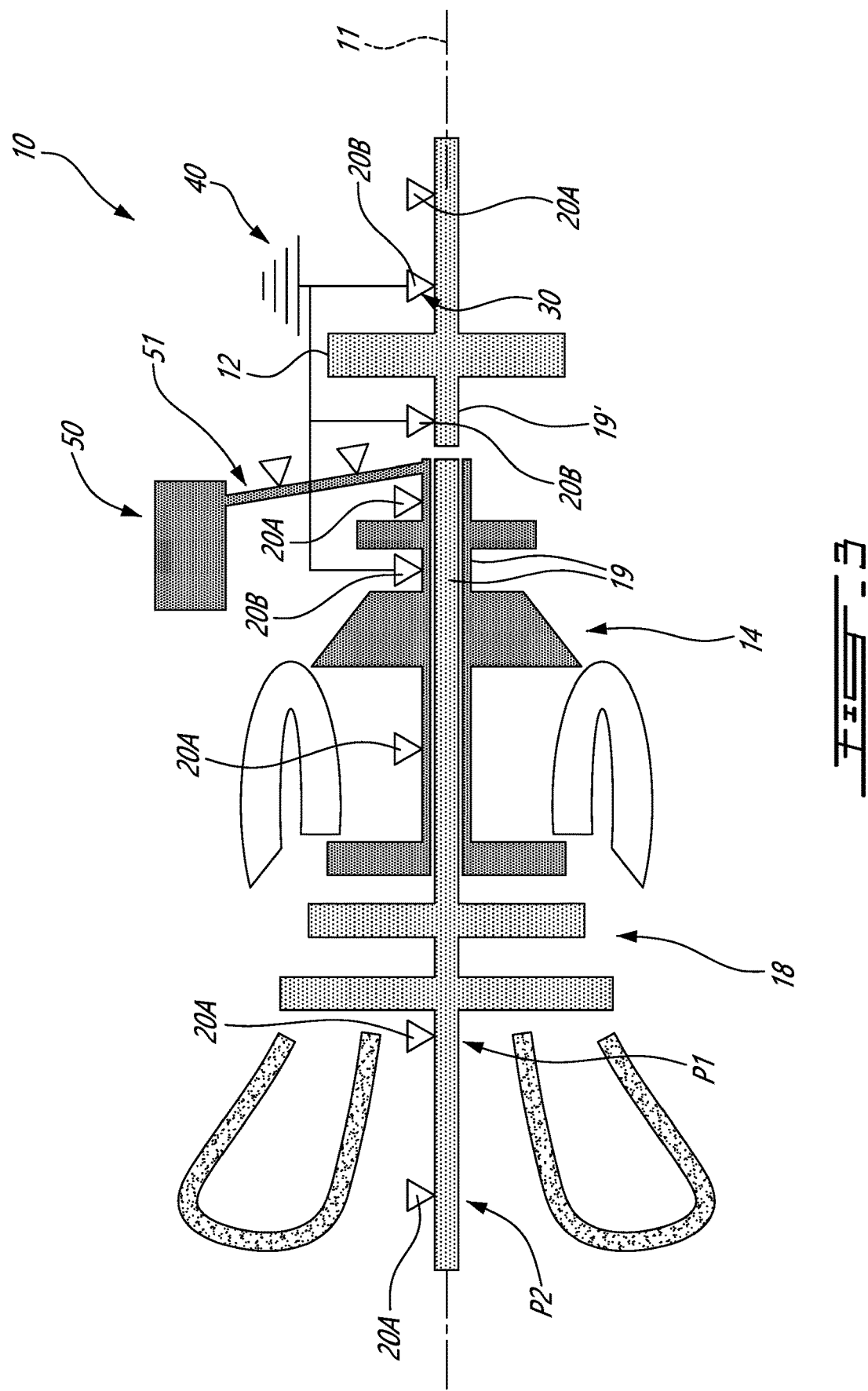

TURBINE ENGINE BEARING USED AS A STATIC ELECTRICITY LEAK PATH

TECHNICAL FIELD

The application relates generally to gas turbine engine and, more particularly, to rotor mountings in such engine.

BACKGROUND OF THE ART

Gas turbine engines typically have one or more rotors mounted into the engine. In some case, it may be desirable to use rotor mountings made of electrically insulating materials. Rotating friction between moving parts, such as rotor mountings components, turbine rotor(s) and/or compressor rotor(s), for instance, may cause electrostatic charge build-up in the rotor(s). This may detrimentally affect the overall performance of the engine. There is thus a need for improvements of gas turbine engines to alleviate at least in part this concern.

SUMMARY

In one aspect, there is provided a gas turbine engine, comprising: a rotor having a shaft mounted to the engine, a plurality of electrically insulating bearings coupled to the shaft and supporting the rotor in the engine, at least one electrically conductive bearing coupled to the shaft and supporting the rotor in the engine, an electrically conductive path between the rotor and an electrical ground of the engine, the electrically conductive path defined through the electrically conductive bearing to reach the electrical ground of the engine.

In another aspect, there is provided a method for electrostatically discharging a rotor supported in a gas turbine engine, the method comprising: supporting the rotor in the engine via a plurality of electrically insulating bearings coupled to a shaft of the rotor; coupling at least one electrically conductive bearing to the shaft to further support the rotor in the engine, defining an electrically conductive path between the rotor and an electrical ground of the engine through the electrically conductive bearing to discharge electrostatic charges accumulating in the rotor during operation of the engine.

In a further aspect, there is provided a gas turbine engine, comprising: a rotor having a first shaft mounted to the engine, a plurality of electrically insulating bearings coupled to the first shaft, a second shaft drivingly engaged to the first shaft, the second shaft electrically contacting the first shaft, at least one electrically conductive bearing coupled to the second shaft, an electrically conductive path between the second shaft and an electrical ground of the engine, the electrically conductive path defined through the electrically conductive bearing to reach the electrical ground of the engine.

DESCRIPTION OF THE DRAWINGS

Reference is now made to the accompanying figures in which:

FIG. 3 is another schematic cross-sectional view of a gas turbine engine such as shown in FIG. 1 with a number of rotor mountings as shown in FIG. 2, in accordance with an embodiment.

DETAILED DESCRIPTION

Figure 1:
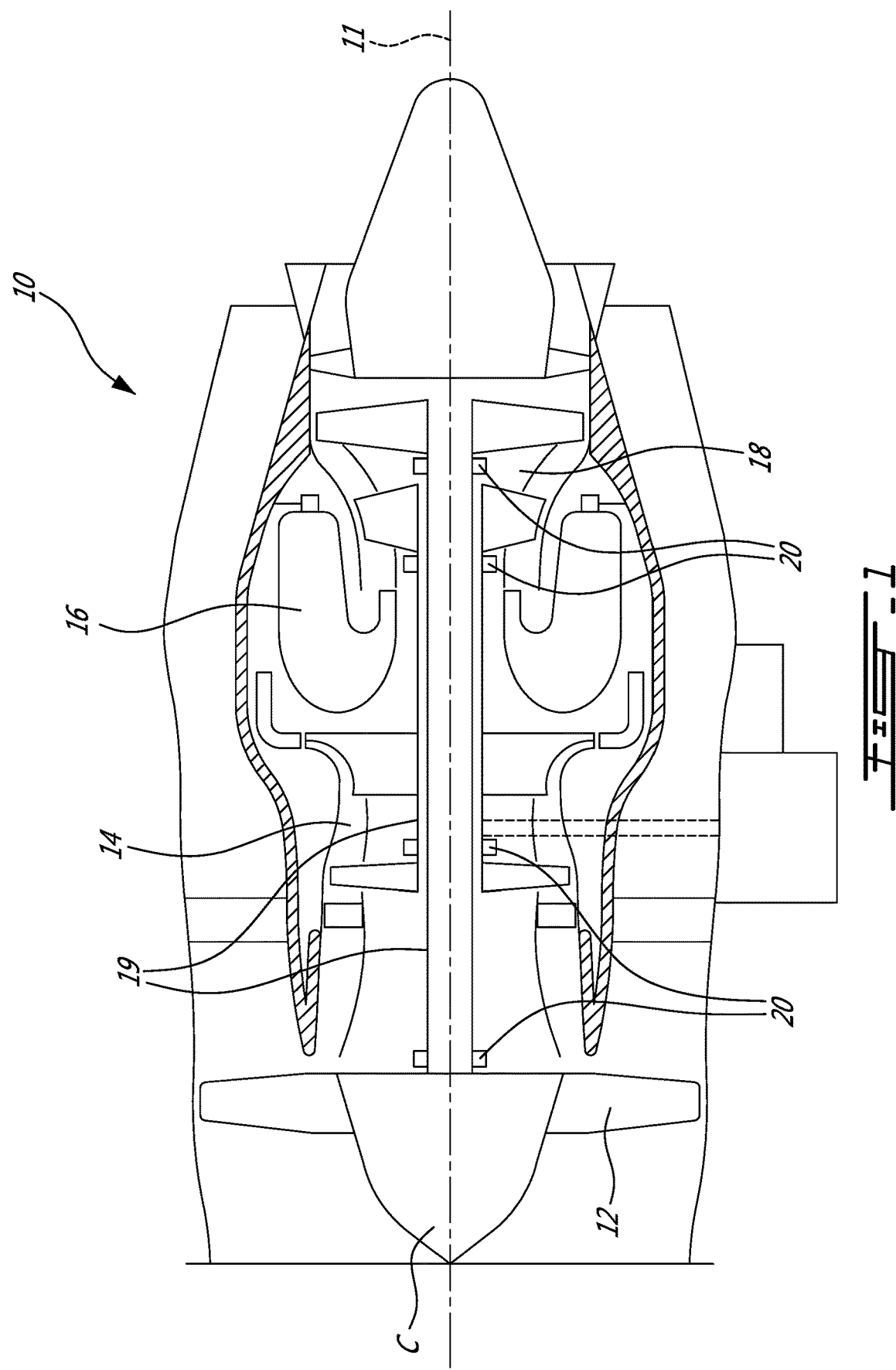
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. A central longitudinal axis 11 of the engine 10 is also shown.

The gas turbine engine 10 also includes one or more rotating shaft(s) 19 forming part(s) of rotors in the compressor section 14 and/or the turbine section 18. The rotors are supported into the engine 10 using rotor mountings allowing rotational and/or axial movement, with two distinct shafts shown in FIG. 1. For instance, the compressor section 14 and the turbine section 18 may each have a single shaft or multiple independent shafts sections in parallel or in series, rotating dependently or independently, depending on the types of turbine engine, and mounted to the gas turbine engine 10 in many suitable ways.

Referring to FIG. 1, the rotor mountings for supporting rotors in the gas turbine engine 10 may be bearings 20, such as ball bearings, roller bearings, thrust bearings, or any other suitable types of bearings. Also, there may have a combination of different types of bearings 20 inside the gas turbine engine 10. The bearings 20 are coupled to the shaft(s) of the rotor(s) and disposed at selected locations along the longitudinal axis 11 of the engine 10. The bearings 20 may have one or more components or parts that may move in a relative radial, axial and/or circumferential movement, as discussed below.

Figure 2:
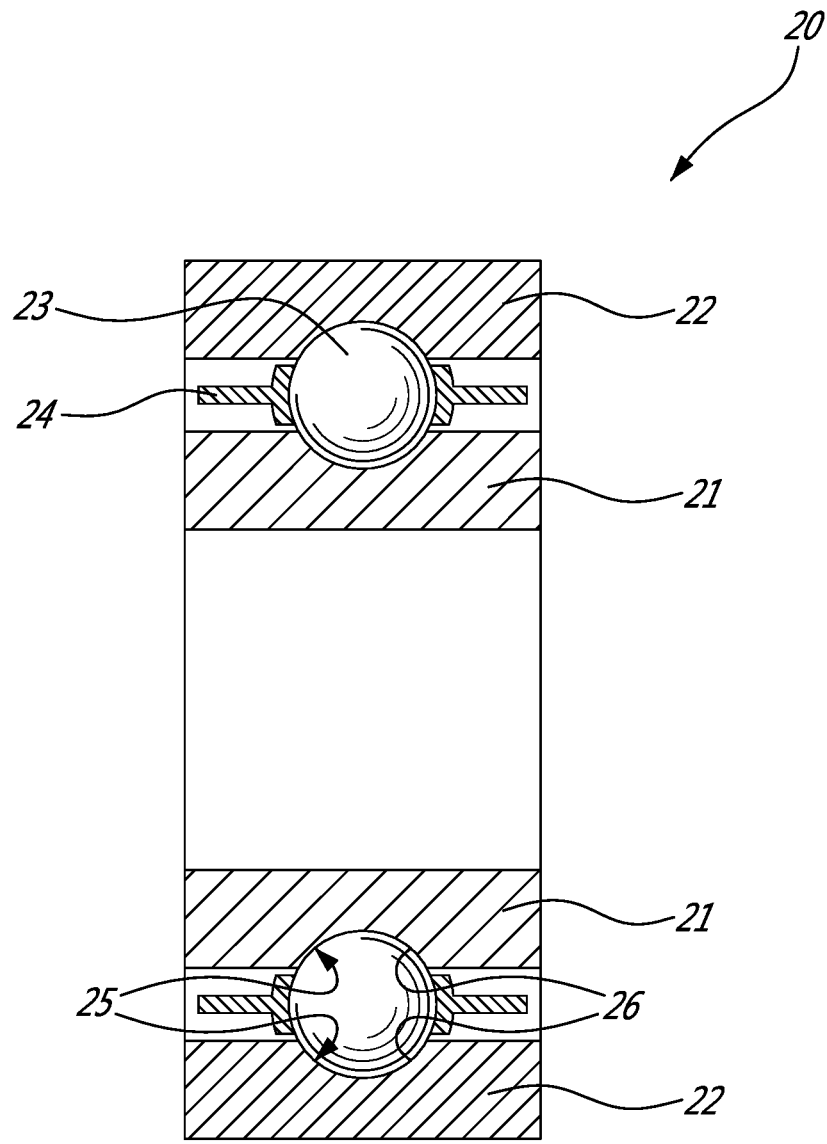
FIG. 2 is a schematic cross-sectional view of a rotor mounting as may be used in the engine of FIG. 1, in accordance with an embodiment.

Referring to FIG. 2, a schematic example of a bearing 20 that may be used in the engine 10 is shown. In an embodiment, the bearings 20 have an inner ring 21 and an outer ring 22 between which a number of rolling elements 23 are disposed circumferentially. As shown, the inner and outer rings 21, 22 are concentric. The inner and outer rings 21, 22 may be referred to as inner race and outer race. In other embodiments, the inner and outer rings 21, 22 may be axially offset relative to one another, which may be the case for some types of thrust bearings, for instance. In some embodiments, the bearing 20 may optionally have a separator 24 (e.g., a cage) between the inner and outer rings 21, 22 to maintain a circumferential spacing between adjacent rolling elements 23. The rolling elements 23 engage raceways 25 defined in the inner and outer rings 21, 22 and may roll along such raceways 25 to allow relative rotation between the inner ring 21 and the outer ring 22. The raceways 25 may be a groove or channel defined in an inner surface 26 of the inner and outer rings 21, 22. The inner surface 26 of the raceways 25 may be adapted to contact the rolling elements 23. The inner surface 26 of the raceways 25 may be sized and shape to conform to a peripheral surface of the rolling elements 23. The rolling elements 23 may have any suitable shape, such as spherical, cylindrical and conical, for instance. The rolling elements 23 may also have other shapes in some embodiments.

It may be desirable to have bearings 20 for supporting the rotor(s) with improved resistance to wear to reduce bearings failure and/or extend the bearings maintenance intervals throughout the lifecycle of the engine 10. The wear on the one or more components or parts of the bearings 20 may be caused by friction at the interface between moving components of the bearing 20 with relative radial, axial and/or circumferential movement, degradation of one or more components of the bearing 20 due to thermal stress caused by the operating conditions of the engine 10 and/or electrical arcing due to electrostatic discharges through the bearing 20. There are many ways to improve a resistance to wear, including the use of bearings 20 having one or more components with a greater resistance to friction, high temperature generated under operating conditions of the engine 10, and/or having one or more components with thermally and/or electrically insulating properties, for instance.

In an embodiment, at least one of the inner ring 21, the outer ring 22 and the rolling elements 23, or parts thereof, is made of a ceramic material. In an embodiment, for instance, the ceramic material may be $Si_3N_4$, though other types of ceramics may be used. In an embodiment, the bearing 20 may entirely be made of ceramic material. In other words, the entire body of the inner ring 21, the outer ring 22, and the rolling elements 23 may be made of a ceramic material. Such types of bearings is often referred to as full-ceramic bearings. In other embodiments, the rolling elements 23 may be made of ceramic material while the inner and outer rings 21, 22 may be made of one or more other materials. For instance, the inner and outer rings 21, 22 may be made of titanium. Other materials may also be contemplated, such as steel, for instance. These types of bearings with some components made of ceramic and other components made of one or more other materials, for instance bearings 20 with rolling elements 23 in ceramic material and the inner and outer rings 21, 22 made of another material, may often be referred to as hybrid ceramic bearings.

Ceramic material typically have greater resistance to friction and/or degradation due to high temperature operating conditions than other materials typically used for making bearings, such as steel, for instance. Using ceramic, hybrid ceramic, or ceramic coated bearings 20 coupled to the shaft(s) 19 for supporting the rotor(s) inside the engine 10 may allow for extended bearings maintenance intervals throughout the lifecycle of the engine 10. Using ceramic, hybrid ceramic, or ceramic coated bearings coupled to the shaft(s) 19 for supporting the rotor(s) may electrically insulate the shaft(s) 19 from the remainder of the engine 10, due to the absence of a straight conductive path. This may prevent or at least limit the risks of arcing, as will be discussed below. Other materials having electrically insulating properties may be contemplated to form entirely or partially one or more components of the bearings 20, and thus to form an electrically insulating bearing 20A. Other materials may be glass, ceramic matrix composites or porcelain, for instance.

In some embodiments, a ceramic coating may be applied to the peripheral surface of the rolling elements 23. Although this may suffice to reduce friction of the rolling elements 23 on the raceways 25 and/or increase the resistance to wear of the bearing 20 as a whole, a ceramic coating may additionally or alternately be applied to the inner surface 26 of the inner ring 21 and/or outer ring 22. Such ceramic coating may be pure alumina oxide ($Al_2O_3$) coating, or oxide mixtures coating, for instance. Other ceramic and/or electrically insulating coatings or materials may also be contemplated, such as Chromium oxide ($Cr_2O_3$), Zirconia oxide ($ZrO_2$), Silicon Nitride ($SiN_4$), or Silicon Carbide (SiC), for instance.

An accumulation of electrostatic charges may occur in one or more components of the rotor(s) and/or at the interface between the shaft(s) 19 and the bearings 20 coupled to the shaft(s) 19. As the rotor(s) of the engine 10 rotate during operation, electrostatic charges may build up in the shaft(s) 19 and/or other parts of the rotor(s) by rotating friction. As the electrostatic charges may accumulate in the shaft(s) 19, a voltage difference may be induced between the shaft(s) 19 and surrounding components. This may cause arcing between the shaft(s) 19 and adjacent electrically conductive components. It may be desirable to avoid such situation that may damage components (i.e. electronic and/or mechanical components) of the engine 10.

Many solutions were contemplated to avoid or limit damage due to arcing through rotor mountings. A typical solution was the use of a grounding device in the engine 10 which included a rubbing member contacting the shaft(s) 19. The rubbing member was used to create a conductive path between the shaft(s) 19 and an electrical ground of the engine 10. A drawback of having such grounding device with a rubbing member against the shaft(s) 19 or other parts of the rotor(s) implied wear associated with the rubbing, which may result in accrued maintenance requirements. While electrostatic charges may accumulate in the shaft(s) 19 where electrically insulating bearings 20A, such as ceramic, hybrid ceramic, ceramic coated, or other types of electrically insulating bearings 20A as discussed above, are coupled to the shaft(s) 19 to support the rotor(s), the electrostatic charges accumulated in the shaft(s) 19 may not leak through the electrically insulating bearings 20A as a consequence of the electrical insulation properties of the bearings 20A.

Referring to FIG. 3, there is shown a schematic cross-sectional view of a gas turbine engine 10 in accordance with an embodiment of the present disclosure. The gas turbine engine 10 comprises a rotor having a shaft 19 mounted to the engine 10 and a plurality of electrically insulating bearings 20A coupled to the shaft 19 and supporting the rotor in the engine 10. The gas turbine engine 10 has an electrically conductive bearing 20B coupled to the shaft 19 and supporting the rotor in the engine 10. An electrically conductive path 30 is defined between the rotor and an electrical ground 40 of the engine 10. The electrically conductive path 30 is defined through the electrically conductive bearing 20B to reach the electrical ground 40 of the engine 10.

The architecture of an electrically conductive bearing 20B may be similar to that of an electrically insulating bearings 20A discussed above and shown in FIG. 2, for instance. The electrically conductive bearing 20B may include rolling elements 23 disposed circumferentially between an inner ring 21 and an outer ring 22 of the electrically conductive bearing 20B.

The electrically conductive bearing 20B is made of an electrically conductive material to facilitate electrical propagation through the bearing 20B, such that it may define an electrically conductive path 30, as opposed to electrically insulating materials and/or the electrically insulating bearings 20A. The electrically conductive material of the electrically conductive bearing 20B may be any electrically conductive materials suitable for use in a gas turbine engine 10 and able to sustain normal operating conditions of such engine 10 (e.g. suitable for high-speed rotation and/or high temperature operation). For instance, the electrically conductive bearing 20B may be made of steel and/or titanium, though other electrically conductive materials may be contemplated. In an embodiment, the rolling elements 23 of the electrically conductive bearing 20B are made of steel, though other materials may be contemplated, such as titanium, or other suitable materials. In an embodiment, the inner ring 21, the outer ring 22 and the rolling elements 23 of the electrically conductive bearing 20B may entirely be made of steel. This may provide better conductivity through the components of the bearing 20B, in certain embodiments.

Typically, lubricant is applied in the bearings 20 to reduce friction between the rolling elements 23 and the raceways 25 of the inner ring 21 and outer ring 22. Use of electrically conductive lubricants, such as an electrically conductive grease, may help to ensure continuous electrical conductivity between the rolling elements 23 of the electrically conductive bearings 20B and their inner and outer rings 21, 22. This may help limiting risk of electrical pitting and/or arcing resulting from imperfect contacts between the rolling elements 23 and the bearing raceways 25. As such, in some embodiments, an electrically conductive lubricant may be used in the electrically conductive bearings 20B to increase their overall conductivity.

There may be any suitable number of electrically conductive bearings 20B. In embodiments where there are a plurality of electrically conductive bearings 20B, these bearings 20B may be distributed along the longitudinal axis 11 of the engine 10 or disposed in a tandem arrangement, adjacent one another, for instance. In an embodiment, the compressor rotor and the turbine rotor may each be supported by at least one electrically conductive bearing 20B, and in a particular embodiment, there may be only one electrically conductive bearing 20B for each one of the compressor rotor and the turbine rotor. The engine 10 may have more than one electrically conductive path 30 between its rotor(s) and the electrical ground 40. For instance, in an embodiment, the engine 10 may have a first electrically conductive path 30 between the rotor passing through a first electrically conductive bearing 20B, and a second electrically conductive path 30 between the same rotor and the electrical ground 40, the second electrically conductive path 30 passing from the same rotor, through a second electrically conductive bearing to the electrical ground. In other embodiments, the engine 10 may have a first electrically conductive path 30 between a first rotor and the electrical ground 40 passing through a first electrically conductive bearing 20B mounted to the first rotor, and a second electrically conductive path 30 between a second rotor and the electrical ground 40 passing through a second electrically conductive bearing 20B mounted to the second rotor. In an embodiment, the first and second conductive bearings 20B are the only conductive bearings 20B mounted to the first and second rotor, where all other bearings supporting the first and second rotors are electrically insulating bearings 20A.

The presence of more than one electrically conductive bearing 20B may provide an electrically conductive path 30 backup, if one of the electrically conductive bearings 20B fails or breaks during operation and/or stop providing a suitable electrically conductive path 30 to discharge the electrostatic charges of the shaft(s) 19, for instance. Additionally, the presence of electrically conductive bearings 20B mounted in a tandem arrangement may help distribute the load applied on the rotor mountings and/or combining electrically conductive bearings 20B respectively adapted to sustain thrust load and axial load (e.g. a tandem arrangement comprising an electrically conductive thrust bearing and an electrically conductive axial load bearing). In an embodiment, an electrically conductive bearing 20B may be mounted in a tandem arrangement with an electrically insulating bearing 20A. As the electrically insulating bearing 20A may have a better resistance to wear and/or load than the electrically conductive bearing 20B due to its material and/or structure, for instance, a combination of an electrically insulating bearing 20A and an electrically conductive bearing 20B in the tandem arrangement may help reducing the load applied to the electrically conductive bearing 20B (i.e. distribution of the load between the bearings of the tandem arrangement), which may extend the life cycle of the electrically conductive bearing 20B. In such tandem arrangement, the electrically conductive bearing 20B may define an electrically conductive path 30 while supporting a lesser amount of load (thrust and/or axial load, for instance) made by the shaft 19 of the rotor coupled thereto, as if the electrically conductive bearing 20B were mounted alone, not in a tandem arrangement. In an embodiment where such tandem arrangement is provided, the electrically conductive bearing 20B may be the sole electrically conductive bearing 20B of the engine. This may be different in other embodiments.

In an embodiment of the gas turbine engine 10, such as shown in FIG. 3, there is a single electrically conductive bearing 20B coupled to the turbine rotor shaft 19, for multiple electrically insulating bearings 20A. A single or more electrically conductive bearing 20B may be coupled to the compressor rotor shaft 19 in other embodiments. In embodiments where there are a plurality of electrically conductive bearings 20B, there may be at least one electrically conductive bearing 20B coupled to each one of the compressor rotor shaft 19 and the turbine rotor shaft 19. As previously mentioned, each shaft 19 may be made of one or more independent shaft sections 19'. There may thus be at least one electrically conductive bearing 20B on each shaft section 19' to ensure proper electrostatic discharge. There may thus be a corresponding number of electrically conductive path 30 defined through respective electrically conductive bearings 20B. This may be different in other embodiments.

It may be desirable to force the electrostatic charges of one or more shaft(s) 19 or one or more shaft section(s) 19' to pass through a single electrically conductive path 30 to reach the electrical ground 40. As such, in an embodiment, the shaft(s) 19 or shaft section(s) 19' may be electrically linked to one another. Stated differently, in embodiments where there are a plurality of shafts 19 and/or shaft sections 19', one or more of them may be electrically connected to each other. As such the electrostatic charges accumulated in one or more of the shaft(s) 19 or shaft(s) sections 19' electrically connected to each other may leak through a single electrically conductive path 30 defined by a single electrically conductive bearing 20B coupled to one of the shaft 19 or shaft section 19'. For instance, in an embodiment, the single electrically conductive bearing 20B supports either one of the compressor rotor or the turbine rotor, and the compressor rotor and the turbine rotor are in electrical contact such that the single electrically conductive path 30 passes between the compressor rotor and the turbine rotor, then through the single electrically conductive bearing 20B to reach the electrical ground 40. In other words, the engine 10 may comprise a single electrically conductive bearing 20B coupled to one of the shaft(s) 19 or shaft section(s) 19' of the engine 10. The other shaft(s) 19 or shaft section(s) 19' may be electrically connected to the shaft 19 or shaft section 19' on which the single electrically conductive bearing 20B is coupled. All the bearings coupled to the other shaft(s) 19 or shaft section(s) 19' may be electrically insulating bearings 20A. The single electrically conductive bearing 20B may thus define a single electrically conductive path 30 between the rotor(s) of the engine 10 and the electrical ground 40. As such, a totality of the electrostatic charges accumulating in the rotor(s) an/or the shaft(s) 19 or shaft section(s) 19' of the engine 10 may be forced to leak through the single conductive path 30 defined by the electrically conductive bearing 20B. The shaft(s) 19 or shaft section(s) 19' mounted only with electrically insulating bearings 20A may be considered as "electrically insulated" from the remainder of the engine 10, but for their electrical connection with the shaft 19 or shaft section 19' on which the electrically conductive bearing 20B is mounted. Although electrostatic charges may accumulate in one of the "electrically insulated" shaft 19 or shaft section 19', they may not leak through the electrically insulating bearings 20A and forced to follow the electrical connection between the "electrically insulated" shaft(s) 19 or shaft section(S) 19' until they reach the single electrically conductive path 30. For instance, in an embodiment, the single electrically conductive bearing 20B supports either one of the compressor rotor or the turbine rotor, and the compressor rotor and the turbine rotor are in electrical contact such that the electrostatic charges may pass between the compressor rotor and the turbine rotor, then through the single electrically conductive path of the single electrically conductive bearing 20B to reach the electrical ground 40.

As the case may be, the electrically conductive bearing(s) 20B may require more frequent maintenance checks to ensure its integrity, for instance due to greater risk of electrical pitting inherent to its purpose of defining an electrically conducting path 30 between the shaft 19 and an electrical ground 40 of the engine 10. It may thus be desirable to dispose the electrically conductive bearing(s) 20B at a location easily accessible during normal engine maintenances. As such, maintenance time and expenses may be reduced. For instance, in an embodiment, at least one electrically conductive bearing 20B may be disposed in a front portion of the engine 10, adjacent the fan 12. More particularly, in an embodiment, the electrically conductive bearing 20B may be coupled to the shaft 19, axially spaced apart from the fan 12 and upstream thereof (i.e. upstream of the fan blades), which may correspond to a location on the shaft 19 under the nose cone C (FIG. 1) of the engine 10. This may also be advantageous, in some embodiments of the engine 10, as this location may correspond to the location where the temperature is at its lowest in the engine 10, along the longitudinal axis 11. Other locations where the temperature of the surrounding area of the electrically conductive bearing 20B is low (e.g. in a cold region of the engine) may be contemplated. For instance, the cold region of the engine may correspond to a region upstream of the compressor section 14. As thermal stress on the electrically conductive bearing 20B resulting from heat generated by the engine 10 under operating conditions may be minimized, this may ensure the integrity of the electrically conductive bearing 20B and/or the electrically conductive path 30 defined through it for a longer period of time.

In addition to or instead of selecting the location of the electrically conductive bearing 20B and/or the electrically conductive path 30 based on the temperature gradient through the engine 10, the location of the electrically conductive bearing 20B may be selected according to the amount of thrust load, radial load and/or vibration load to be supported by the bearings. For instance, as shown in FIG. 3, the engine 10 may comprise an accessory gearbox 50 (AGB 50) offset from the longitudinal axis 11 of the engine 10. The AGB 50 may be driven by the compressor rotor via a shaft 51 drivingly engaged to the shaft(s) 19 of the compressor rotor via suitable gears or couplings and connected to an input of the AGB 50. In some instances, the AGB 50 may be used to drive a generator (not shown) or other auxiliary devices of the engine 10 or the aircraft. The driving shaft 51, in embodiments where it is present, may be supported by one or more bearings, which may or may not be electrically insulating bearing(s) 20A. In an embodiment, the engine comprises at least one electrically conductive bearing 20B coupled to the driving shaft 51. As such, the electrostatic charges that may accumulate in the rotating components of the engine 10, including the shaft(s) 19 and rotor as discussed above may pass through the driving shaft 51 and discharged through the at least one electrically conductive bearing 20B via the electrically conductive path 30 defined therethrough toward the electrical ground 40.

In a particular embodiment, the engine 10 comprises a single electrically conductive bearing 20B, which is coupled to the driving shaft 51 driving the AGB 50, or other auxiliary shafts driving an auxiliary load of the engine 10 or auxiliary device(s) of the aircraft, with all the bearings supporting the rotor(s) of the engine 10 being electrically insulating bearings 20A. In such cases, as the driving shaft 51 may be drivingly and electrically connected to one of the rotor(s), with the rotor(s) at least electrically connected to each other, the electrostatic charges that may accumulate in the rotating components of the engine 10, including the "electrically insulated" rotor(s), may be forced to discharge via the driving shaft 51, through the single electrically conductive path 30 defined by the single electrically conductive bearing 20B coupled to the drive shaft 51, toward the electrical ground 40. In some embodiments, the driving shaft 51 or other auxiliary shafts may have more than one electrically conductive bearing 20B coupled thereto for defining a corresponding number of electrically conductive path 30 between the driving shaft 51/auxiliary shaft and the electrical ground 40.

In an embodiment, the driving shaft 51 may correspond to the smallest shaft of the engine 10. In some embodiments, coupling the electrically conductive bearing 20B to the smallest shaft of the engine 10 may be desirable, as the electrically conductive bearing 20B may not have to support a great amount of load (an amount of load greater than the load supported by the bearings supporting the compressor and/or turbine rotor(s), for instance). It is understood that the smallest shaft of the engine 10 is not necessarily the driving shaft 51 in some embodiments. Stated differently, the electrically conductive bearing 20B may be the smallest bearing coupled to one of the shaft(s) 19, 51 or shaft section 19 of the engine 10, which may have to support the smallest load of the sum of the loads supported by the other bearings of the engine 10. As such, in some embodiments, the gains associated with having it designed in ceramic instead of steel (or other conductive materials), for instance, would be the least in terms of engine performance.

In an embodiment, the electrically conductive path 30 may be located in a region of the engine 10 adjacent a source from which a greater amount of electrostatic charges may be typically generated. For instance, in an embodiment, this source may correspond to the fan 12, which may rub intermittently with the fan shroud, for instance. Other sources or zones of electrostatic charges may be targeted and equipped with an electrically conductive path 30, defined through an electrically conductive bearing 20B. For instance, the electrically conductive bearing 20B and the electrically conductive path 30 defined therewith may be located at the closest location to the engine 10 mount position (the engine 10 mounts that connect the engine 10 to the aircraft). This may be advantageous in some embodiments, to limit engine 10 issues that may be associated with such unforeseeable situation, for instance.

Other locations may be contemplated for the electrically conductive bearing 20B. For instance, in an embodiment, the at least one electrically conductive bearing 20B and the electrically insulating bearings 20A are spaced axially along the central longitudinal axis 11 of the gas turbine engine 10. The at least one electrically conductive bearing 20B may be located between electrically insulating bearings 20B. The at least one electrically conductive bearing 20B may be located in the compressor section 14 or the turbine section 18. In some embodiments, the gas turbine engine 10 may have a turbine section 18 having at least a first and second stage turbines, where the second stage turbine is disposed downstream of the first stage turbine. In such case, the at least one electrically conductive bearing 20B may be disposed upstream of the first stage turbine, for instance. However, in other embodiments, the at least one electrically conductive bearing 20B may be disposed downstream of the latest turbine stage. This location may correspond to the positions P1 or P2 shown in FIG. 3, according to an embodiment. In some embodiments, the at least one electrically conductive bearing 20B may also be disposed between compressor stages in the compressor section 14 of the engine 10 or upstream of a first compressor stage. The present disclosure thus provide a method for electrostatically discharging a rotor supported in a gas turbine engine 10, as described below. More particularly, in an embodiment, such method comprises supporting a rotor (e.g. turbine rotor and/or compressor rotor) in the engine 10 via a plurality of electrically insulating bearings 20A coupled to one or more shaft(s) 19 or shaft(s) sections 19' of the rotor. At least one electrically conductive bearing 20B is coupled to the one or more shaft(s) 19 or shaft(s) sections 19' to further support the rotor in the engine. This incidentally provides an electrically conductive path 30 between the rotor and an electrical ground 40 of the engine 10 to discharge electrostatic charges accumulating in the rotor during operation of the engine 10. Some variants of the method disclosed will become apparent by the reading of the previous paragraphs in connection with the variants of the engine 10 described above.

The above description is meant to be exemplary only, and one skilled in the art will recognize that changes may be made to the embodiments described without departing from the scope of the invention disclosed. For instance, in an embodiment, at least the rolling elements 23 of the electrically conductive bearings 20B may be made of insulating material, such as ceramic material. However, in such case, the bearings 20B may include an electrically conductive member (for instance a shunt) electrically connecting the inner and outer rings 21, 22 to provide a conductive path 30 between the shaft 19 and the electrical ground 40 of the engine 10. As such, the bearings 20B may still be considered as "conductive" and perform as an electrical path 30. Still other modifications which fall within the scope of the present invention will be apparent to those skilled in the art, in light of a review of this disclosure, and such modifications are intended to fall within the appended claims.

The invention claimed is:

1. A gas turbine engine, comprising:
a rotor having a shaft mounted to the engine,
a plurality of electrically insulating bearings coupled to the shaft and supporting the rotor in the engine,
at least one electrically conductive bearing coupled to the shaft and supporting the rotor in the engine,
an electrically conductive path between the rotor and an electrical ground of the engine, the electrically conductive path defined through the electrically conductive bearing to reach the electrical ground of the engine.

2. The gas turbine engine as defined in claim 1, wherein the gas turbine engine comprises a single electrically conductive bearing and a single electrically conductive path, the single electrically conductive bearing coupled to the shaft to provide the single electrically conductive path between the shaft and the electrical ground of the engine.

3. The gas turbine engine as defined in claim 1, wherein the at least one electrically conductive bearing has rolling elements made of steel and the electrically insulating bearings have rolling elements made of ceramic.

4. The gas turbine engine as defined in claim 1, wherein the rotor includes a plurality of shafts, the engine comprising a single electrically conductive bearing mounted to a first one of the shaft, a second one of the shaft electrically contacting the first shaft, whereby the electrically conductive path includes the single electrically conductive bearing.

5. The gas turbine engine as defined in claim 1, wherein the shaft is a first shaft, the gas turbine engine comprising a second shaft, the first shaft and the second shaft each supported by a respective one of two electrically conductive bearings.

6. The gas turbine engine as defined in claim 1, wherein the rotor is a first rotor, the first rotor being a compressor rotor located in a compressor section of the gas turbine engine, the gas turbine engine comprising a second rotor, the second rotor being a turbine rotor located in a turbine section of the gas turbine engine, the engine comprising a single electrically conductive bearing supporting either one of the compressor rotor or the turbine rotor, all other bearings supporting being electrically insulating bearings, the compressor rotor and the turbine rotor being in electrical contact such that the electrically conductive path passes between the compressor rotor and the turbine rotor, through the single electrically conductive bearing to the electrical ground.

7. The gas turbine engine as defined in claim 1, wherein the at least one electrically conductive bearing and the electrically insulating bearings are spaced axially along a central longitudinal axis of the gas turbine engine, the at least one electrically conductive bearing is located between electrically insulating bearings.

8. The gas turbine engine as defined in claim 1, wherein the electrically conductive path is a first electrically conductive path passing through a first electrically conductive bearing, the gas turbine engine comprising a second electrically conductive path between the rotor and the electrical ground, the second electrically conductive path passing from the rotor, through a second electrically conductive bearing to the electrical ground.

9. The gas turbine engine as defined in claim 1, wherein the gas turbine engine has a fan mounted to the shaft at a front portion of the engine, the at least one electrically conductive bearing and the fan longitudinally spaced apart along a central longitudinal axis of the engine, the at least one electrically conductive bearing located upstream of the fan.

10. The gas turbine engine as defined in claim 1, wherein the at least one electrically conductive bearing has rolling elements made of steel.

11. A method for electrostatically discharging a rotor supported in a gas turbine engine, the method comprising:
supporting the rotor in the engine via a plurality of electrically insulating bearings coupled to a shaft of the rotor;
coupling at least one electrically conductive bearing to the shaft to further support the rotor in the engine,
defining an electrically conductive path between the rotor and an electrical ground of the engine through the electrically conductive bearing to discharge electrostatic charges accumulating in the rotor during operation of the engine.

12. The method as defined in claim 11, wherein discharging the electrostatic charges includes directing the electrostatic charges through the electrically conductive path via the electrically conductive bearing of the engine being a single electrically conductive bearing.

13. The method as defined in claim 11, wherein defining the electrically conductive path includes locating the electrically conductive path outside a turbine section of the engine, upstream of a compressor section.

14. The method as defined in claim 11, wherein defining the electrically conductive path includes locating the electrically conductive path upstream of a fan of the engine.

15. The method as defined in claim 11, wherein defining the electrically conductive path includes locating the electrically conductive path in a region of the engine where heat generated by the engine is minimal.

16. A gas turbine engine, comprising:
a rotor having a first shaft mounted to the engine,
a plurality of electrically insulating bearings coupled to the first shaft,
a second shaft drivingly engaged to the first shaft, the second shaft electrically contacting the first shaft,
at least one electrically conductive bearing coupled to the second shaft,
an electrically conductive path between the second shaft and an electrical ground of the engine, the electrically conductive path defined through the electrically conductive bearing to reach the electrical ground of the engine.

17. The gas turbine engine as defined in claim 16, wherein the engine comprises a single electrically conductive bearing, the single electrically conductive bearing coupled to the second shaft to provide a single electrically conductive path between the shafts and the electrical ground of the engine, wherein all the bearings supporting the rotor of the engine are electrically insulating bearings.

18. The gas turbine engine as defined in claim 16, wherein the second shaft is the smallest one of the shafts in the engine.

19. The gas turbine engine as defined in claim 16, wherein the second shaft is drivingly engaged to an accessory gearbox to drive an auxiliary load.

20. The gas turbine engine as defined in claim 16, wherein the electrically conductive bearing is located outside a turbine section of the engine.

* * * * *